United States Patent
Fludkov

(10) Patent No.: US 11,824,915 B2
(45) Date of Patent: Nov. 21, 2023

(54) METHOD, COMPUTER PROGRAM AND SYSTEM FOR STREAMING A VIDEO CONFERENCE IN A MULTI-POINT VIDEOCONFERENCING SYSTEM

(71) Applicant: Pexip AS, Oslo (NO)

(72) Inventor: Mikhail Fludkov, Oslo (NO)

(73) Assignee: Pexip AS, Oslo (NO)

( * ) Notice: Subject to any disclaimer, the term of this patent is extended or adjusted under 35 U.S.C. 154(b) by 266 days.

(21) Appl. No.: 17/519,064

(22) Filed: Nov. 4, 2021

(65) Prior Publication Data
US 2023/0140286 A1  May 4, 2023

(51) Int. Cl.
*H04N 19/40* (2014.01)
*H04L 65/65* (2022.01)
*H04L 65/80* (2022.01)
*H04N 7/15* (2006.01)

(52) U.S. Cl.
CPC .............. *H04L 65/80* (2013.01); *H04L 65/65* (2022.05); *H04N 7/152* (2013.01); *H04N 19/40* (2014.11)

(58) Field of Classification Search
CPC ......... H04L 65/80; H04L 65/65; H04N 19/40; H04N 7/152
See application file for complete search history.

(56) References Cited

U.S. PATENT DOCUMENTS

| | | | |
|---|---|---|---|
| 2006/0087553 A1* | 4/2006 | Kenoyer | H04N 7/152 348/E7.084 |
| 2008/0175325 A1* | 7/2008 | Hannuksela | H04N 19/70 375/240.26 |
| 2009/0231415 A1* | 9/2009 | Moore | H04N 21/2662 348/E7.083 |
| 2009/0259766 A1* | 10/2009 | Karlsson | H04N 21/6437 709/231 |

* cited by examiner

*Primary Examiner* — Amal S Zenati
(74) *Attorney, Agent, or Firm* — Christopher & Weisberg, P.A.

(57) ABSTRACT

A system and method for streaming a video conference in a multi-point videoconferencing system includes video conferencing terminals in communication with a multipoint conferencing node (MCN), a streaming server in communication with the MCN and media stream viewers in communication with the streaming server.

14 Claims, 6 Drawing Sheets

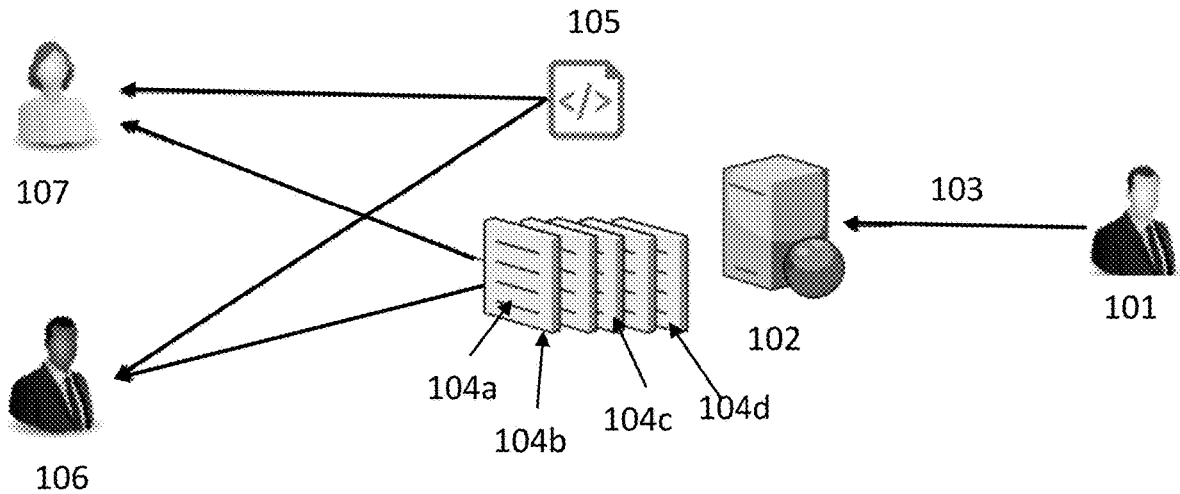

Fig. 1

```
<?xml version="1.0"?>
  <BaseURL>
  http://example.com/segments
  </BaseURL>
  <Representation id="0" mimeType="video/mp4" width="1920" height="1080" bandwidth="5000000">
  <SegmentList>
    <SegmentURL media="main/news100/0.mp4" mediaRange="0-10"/>
    <SegmentURL media="main/news100/1.mp4" mediaRange="10-20"/>
    <SegmentURL media="main/news100/2.mp4" mediaRange="20-30"/>
  </SegmentList>
  </Representation>
  <Representation id="1" mimeType="video/mp4" width="1280" height="720" bandwidth="2500000">
  <SegmentList>
    <SegmentURL media="main/news200/0.mp4" mediaRange="0-10"/>
    <SegmentURL media="main/news200/1.mp4" mediaRange="10-20"/>
    <SegmentURL media="main/news200/2.mp4" mediaRange="20-30"/>
  </SegmentList>
  </Representation>
  ...
```

Fig. 2

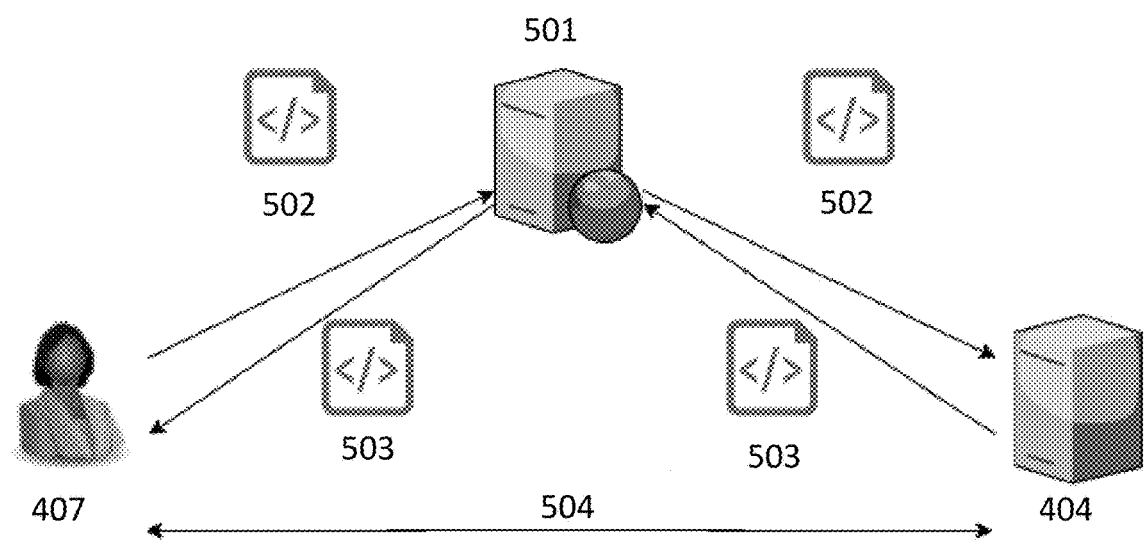
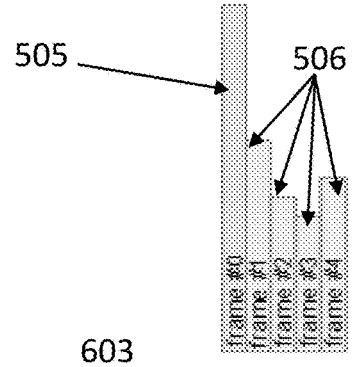
Fig. 5
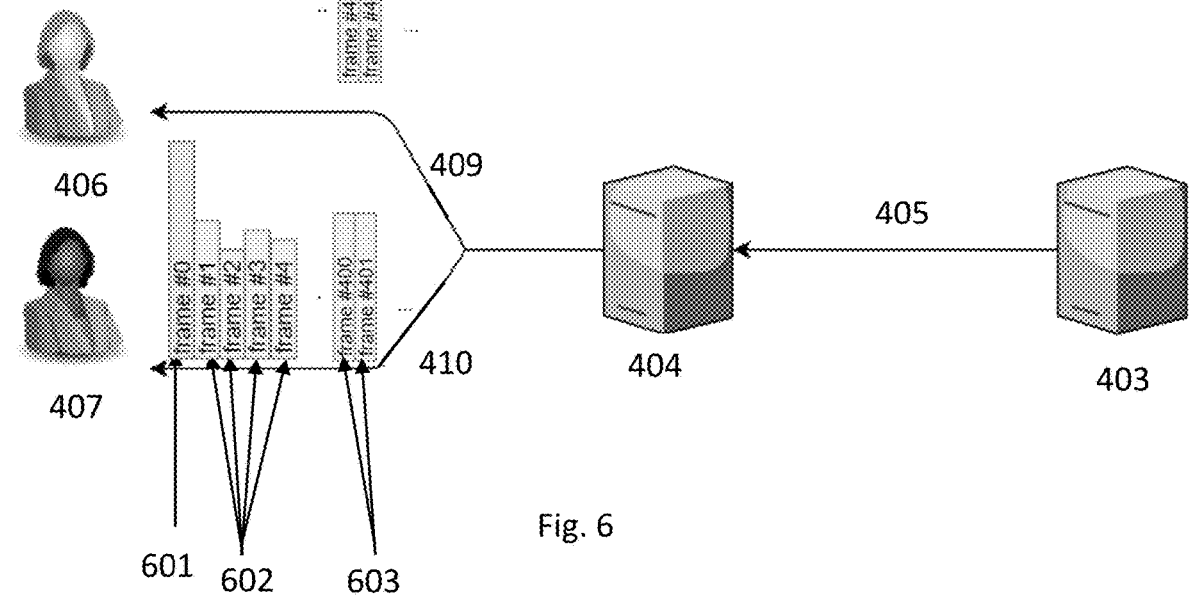
Fig. 6

METHOD, COMPUTER PROGRAM AND SYSTEM FOR STREAMING A VIDEO CONFERENCE IN A MULTI-POINT VIDEOCONFERENCING SYSTEM

CROSS-REFERENCE TO RELATED APPLICATION n/a.

FIELD

The present invention relates to a system and a method of method of streaming a video conference in a multi-point videoconferencing system, using RTP and WebRTC to achieve low latency

BACKGROUND

Transmission of moving pictures in real-time is employed in several applications like e.g. video conferencing, team collaboration software, net meetings and video telephony. Terminals and endpoints being able to participate in a conference may be traditional stationary video conferencing endpoints, external devices, such as mobile and computer devices, smartphones, tablets, personal devices and PCs, and browser-based video conferencing terminals.

Video conferencing systems allow for simultaneous exchange of audio, video and data information among multiple conferencing sites. For performing multipoint video conferencing, there usually is a Multipoint Conferencing Node (MCN) that provides switching and layout functions to allow the endpoints and terminals of multiple sites to intercommunicate in a conference. Such nodes may also be referred to as Multipoint Control Units (MCUs), Multi Control Infrastructure (MCI), Conference Nodes and Collaborations Nodes (CNs). MCU is the most common used term, and has traditionally has been associated with hardware dedicated to the purpose, however, the functions of an MCN could just as well be implemented in software installed on general purpose severs and computers, so in the following, all kinds of nodes, devices and software implementing features, services and functions providing switching and layout functions to allow the endpoints and terminals of multiple sites to intercommunicate in a conference, including (but not excluding) MCUs, MCIs and CNs are from now on referred to as MCNs.

An MCN links the sites together by receiving frames of conference signals from the sites, processing the received signals, and retransmitting the processed signals to appropriate sites. The conference signals include audio, video, data and control information. As an example, in a switched conference, the video signal from one of the conference sites, typically that of the loudest speaker, is broadcasted to each of the participants. In a so-called continuous presence conference, video signals from two or more sites are spatially mixed to form a composite video signal for viewing by conference participants. When the different video streams have been mixed together into one single video stream, the composed video stream is transmitted to the different parties of the video conference, where each transmitted video stream preferably follows a set scheme indicating who will receive what video stream. The continuous presence or composite video stream is a combined picture that may include live video streams, still images, menus, indicators or other visual images from participants in the conference.

The MCN creates dynamic layouts of the mixed video picture in video conferencing in order to achieve natural and intuitive engagement of the participants in line with physical presence meeting room settings. When emulating larger events, such as all hands meetings, townhall meetings and virtual conferences, in a videoconference session, the traditional meeting room settings may fall short. Managing many people in this type of a format can be difficult, hence video conferences between a limited number of active participants has been streamed to a streaming audience. The streaming audience receives a link to a streaming service, either before, during, or after the event. The link initiates a HTTP connection to a streaming web server and initiates a series of downloads from the streaming web server. Common protocols for HTTP based streaming is MPEG-DASH and HLS.

A problem with HTTP based streaming for live broadcast is latency of several seconds. FIG. 1 illustrates live broadcasting using HTTP based streaming of prior art. A broadcaster 101 records and transmits a source stream 103 comprising audio and video to a streaming web server 102. The source stream 103 may be recorded by any recording device such as a television studio, a personal computer, mobile phone or any other device suitable to record and transmit a stream comprising audio and video. The source stream 103 may be for example be transmitted to the streaming web server 102 using the RTMP-protocol. The streaming web server 102 creates at least one copy of the source stream 103 by transcoding it to at least one of a plurality of resolutions, e.g. 1080p: 5000 Kbps video, 256 Kbps audio, 720p: 2500 Kbps video, 256 Kbps audio, 560p: 1500 Kbps video, 256 Kbps audio, and/or 360p: 500 Kbps video, 128 Kbps audio. Furthermore, the streaming web server 102 splits at least one copy of the source stream 103 into segments. The recommended segment size is in the range between 5 to 10 seconds. Each segment is saved in streaming web server 102 as a separate media file 104a, 104b, 104c, 104d and becomes available for downloading. The separate media files 104a, 104b, 104c, 104d are typically stored in MP4 or TS format media files.

Links to the stored separate media files 104a, 104b, 104c, 104d are published in a Media Presentation Description-document 105. An exemplary Media Presentation Description document 105 is illustrated in FIG. 2. The exemplary Media Presentation Description documents 105 lists six media segments and what at least one copy of the source stream 103 they represent. The first copy of the source stream, id="0", represent a media stream of resolution 1080p having tree media segments of 10 seconds, http://example.com/segments/main/news100/0.mp4 represents the first 10 second segment of the 1080p stream, http://example.com/segments/main/news100/1.mp4 represents the next 10 seconds and http://example.com/segments/main/news100/2.mp4 next 10 second and so on. In the same manner a second copy the source stream 103, id="1", represents a media stream of resolution 720p comprising the same media segments as the first copy of the source stream 103 in the different resolution.

A viewer client 106, 107, when initiating a HTTP connection to the streaming web server 102, the client 106, 107 first downloads the Media Presentation Description-document 105. The client 106, 107 selects to download one of the at least one copy of the source stream 103. The selection of which of the at least one copy of the source stream 103 may be based on for example bandwidth constraints between the of the client 106, 107 and the streaming web server 102, on the screen size of the client 106, 107 and so on. Client 106 and client 107 may download different copies of the source stream 103. Client 106 may for example download media segments belonging to stream id="0", while client 107 downloads media segments belonging to stream id="1".

For non-live streaming scenarios, the Media Presentation Description-document 105, comprises segments covering the full duration of a media stream being played. For example, the Media Presentation Description-document 105 for a one-hour long video clip will contain 360 10 second segments.

In live broadcast scenarios, the full duration of a streaming event is obviously not known until the streaming event is finished, thus the Media Presentation Description-document 105 at any time comprises the most recent N segments. In order for a client 106, 107 to download any next segment it needs to keep itself up to date with the latest segments by repeatedly downloading an updated version of the Media Presentation Description-document 105.

The latency of the system is the time period from the broadcaster 101 transmits the source stream 103 to the client 106, 107 displays a copy of the source stream 103. Once the streaming web server 102 receives the source stream 103 the latency is determined by several method steps. First the streaming web server 102 transcodes the first segment and stores the first media file 104a. Then the Media Presentation Description-document 105 is updated with the new segment. The client 106, 107 downloads the Media Presentation Description-document 105, parses the Media Presentation Description-document 105 and downloads the first media file 104a. The client 106, 107 decodes the first media file 104a and displays the content on a screen of the client 106, 107. Of these steps, only the first step of transcoding the first segment contributes significantly to the latency. The other steps each just take milliseconds.

FIG. 3 schematically illustrates the process of transcoding the source stream 103 into at least one copy of the source stream 103 at a desired bitrate and splitting the at least one copy of the source stream 103 into a segment, the first media file 104a. The video data of the first media file 104a comprises a plurality of video frames 301, 302. There are two types of video frames, I-frames 301 (sometimes referred to as key frames), and P-frames 302. I-frames is a starting point for a video decoder. The I-frame 301 is the first video frame in the first media file 104a and is used as a reference for the next P frames 302. The I-frame 301 comprises a complete image, whereas the P-frames 302 comprises changes in the image from the previous frame, or the changes between the current frame and both the preceding and following frames. Since the P-frames 302 only comprises changes, e.g. differences, the P-frames 302 are much smaller in size (fewer bits) than the I-frame 301. Each media file 104a, 104b, 104c, 104d in the Media Presentation Description-document 105 needs to be individually decodable by the video decoder, thus the first frame of each media file 104a, 104b, 104c, 104d must be an I-frame.

The recommended segment size for HTTP based streaming is in the range between 5 to 10 seconds, sometimes as low as 2 seconds. The segment size effectively defines the latency between the broadcaster 101 and the client 106, 107, thus the minimum achievable latency of HTTP based streaming applications is 2 seconds, but in practice more. One could consider reducing the latency by reducing the segment size to e.g. 1 second or 500 milliseconds, however, that is in practice not possible. Decreasing the size of the segments results in many small segments. Each segment must be individually decodable, thus comprising at least one I-frame. Many small segments will then require transmitting lots of I-frames. Since I-frames are larger than P-frames and not easy to compress, transmitting many small segments is not bandwidth efficient.

It is therefore a need for an alternative system and method for streaming of video conferences that reduces the latency between the broadcaster and the clients.

SUMMARY

In view of the above, an object of the present invention is to overcome or at least mitigate drawbacks of prior art video conferencing systems.

In a first aspect the invention provides a method of streaming a video conference in a multi-point videoconferencing system comprising a plurality of video conferencing terminals in communication with a multipoint conferencing node (MCN), a streaming server in communication with the MCN and a plurality of media stream viewers in communication with the streaming server, wherein the method comprising:
    transcoding, using the MCN, a source media stream into at least one of a plurality of resolutions, the source media stream comprising mixed audio and video received from the plurality videoconference terminals;
    transmitting the source media stream in the at least one of the plurality of resolutions to the streaming server using Real-time Transport Protocol (RTP);
    negotiating, using the streaming server, unidirectional capabilities with each of the plurality of media stream viewers using WebRTC;
    repacketization, using the streaming server, of the source media stream into separate media streams to each of the plurality of media stream viewers according to their respective negotiated unidirectional capabilities; and
    transmitting the separate media streams from the streaming server to the respective plurality of media stream viewer using RTP.

In one embodiment, the method may further comprising the steps of:
    receiving a request on the streaming server from one of the plurality of the media stream viewers to receive the separate media stream in one of the plurality of resolutions; and
    sending a request to the MCN from the streaming server to transcode and transmit the requested one of the plurality of resolutions if determining with the streaming server that the source media stream received from the MCN does not comprise the requested one of the plurality of resolutions.

In one embodiment, the method may further comprising the step of upon determining with the MCN that one of the plurality of resolutions is not requested by the streaming server stop transcoding and transmitting the one of the plurality of resolutions.

In one embodiment, the step of transcoding the source media stream into at least one of a plurality of resolutions may further comprising generating video streams with I-frames at a predetermined fixed rate.

In one embodiment, the method may further comprising the step of performing rate limiting of Picture Loss Indication (PLI) messages received from plurality of media stream viewers on the streaming server, and transmitting a rate limited number of the PLI messages to the MCN. The rate limited number may in one embodiment be maximum 2 PLI messages per second.

In one embodiment, the method may further comprising the steps of upon detecting with the streaming server packet loss in the source media stream, then stopping transmission of P-frames to the plurality of video stream viewers until a new I-frame is received by the streaming server.

In a second aspect the invention provides a multi-point videoconferencing system for streaming of a video conference, the system comprising a plurality of video conferencing terminals in communication with a multipoint conferencing node (MCN), a streaming server in communication with the MCN and a plurality of media stream viewers in communication with the streaming server, wherein:

the MCN is adapted to:
perform transcoding of a source media stream into at least one of a plurality of resolutions, the source media stream comprising mixed audio and video received from the plurality videoconference terminals; and
transmitting the source media stream in the at least one of the plurality of resolutions to the streaming server using Real-time Transport Protocol (RTP), the streaming server is adapted to:
negotiating unidirectional capabilities with each of the plurality of media stream viewers using WebRTC,
performing repacketization, using the streaming server, of the source media stream into separate media streams to each of the plurality of media stream viewers according to their respective negotiated unidirectional capabilities,
transmitting the separate media streams from the streaming server to the respective plurality of media stream viewer using RTP.

In one embodiment, the streaming server may be further adapted to receiving a request from one of the plurality of the media stream viewer to receive the separate media stream in one of the plurality of resolutions, and sending a request to the MCN to transcode and transmit the requested one of the plurality of resolutions if determining with the streaming server that the source media stream received from the MCN does not comprise the requested one of the plurality of resolutions.

In one embodiment, the MCN may be further adapted to upon determining that one of the plurality of resolutions is not requested by the streaming server stop transcoding and transmitting the one of the plurality of resolutions.

In one embodiment, the MCN may be further adapted to generating video streams with I-frames at a predetermined fixed rate when transcoding the source media stream into at least one of a plurality of resolutions.

In one embodiment, the streaming server may be further adapted to performing rate limiting of Picture Loss Indication (PLI) messages received from plurality of media stream viewers, and transmitting a rate limited number of the PLI messages to the MCN. The rate limited number may in one embodiment be maximum 2 PLI messages per second.

In one embodiment, the streaming server may be further adapted to upon detecting packet loss in the source media stream, then stopping transmission of P-frames to the plurality of video stream viewers until a new I-frame is received by the streaming server.

BRIEF DESCRIPTION OF THE DRAWINGS

A more complete understanding of the present invention, and the attendant advantages and features thereof, will be more readily understood by reference to the following detailed description when considered in conjunction with the accompanying drawings wherein:

FIG. 1 is a schematic illustration of a multi-point videoconferencing system for streaming a video conference;

FIG. 2 is an exemplary Media Presentation Description document;

FIG. 5 is a schematic illustration an exemplary multi-point videoconferencing system for streaming a video conference;

FIG. 6 is a schematic illustration an exemplary multi-point videoconferencing system for streaming a video conference;

DETAILED DESCRIPTION

According to embodiments of the present invention as disclosed herein, the above-mentioned disadvantages of solutions according to prior art are eliminated or at least mitigated.

Figure 3:
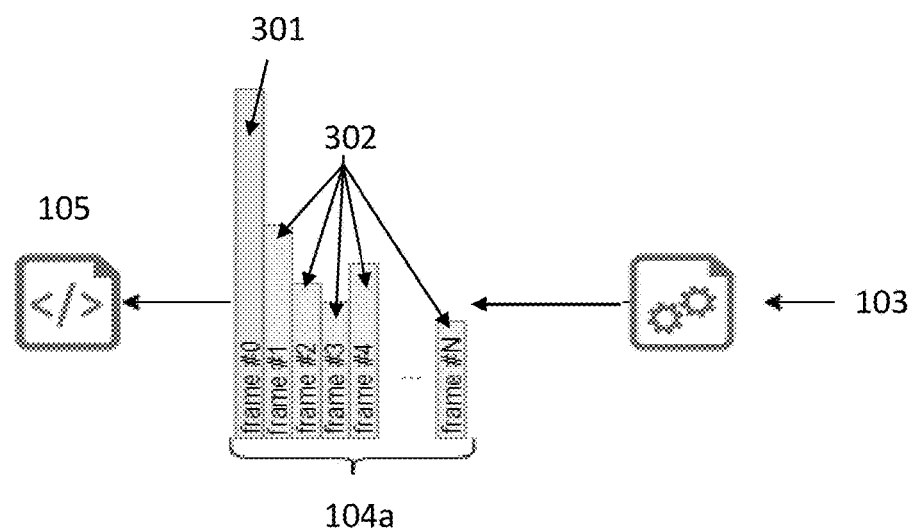
FIG. 3 is a schematic illustration of a process of transcoding and storing a source stream as a media file.
Figure 4:
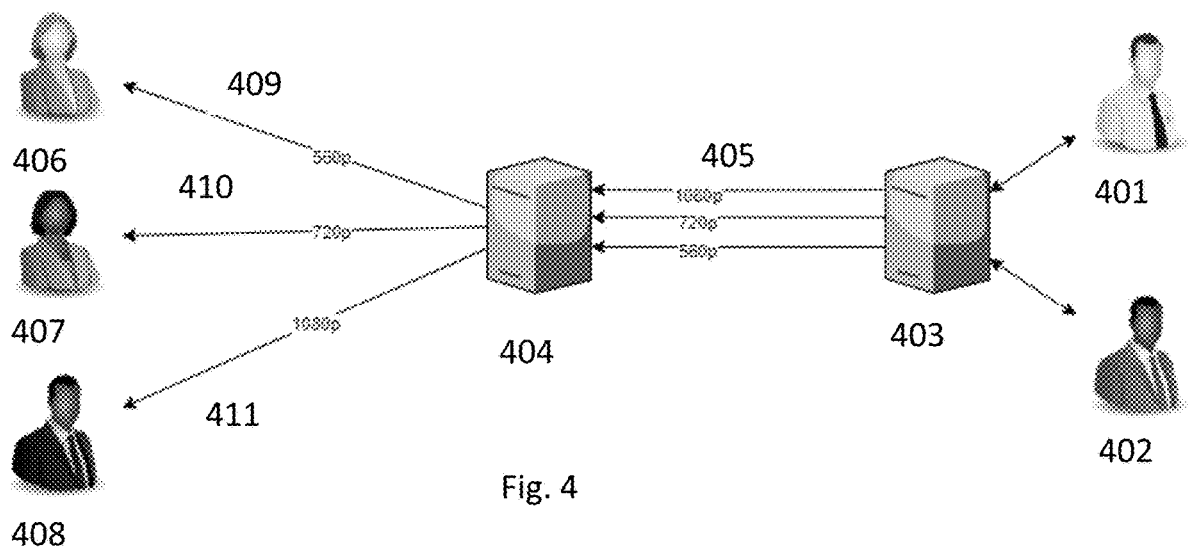
FIG. 4 is a schematic illustration of an exemplary multi-point videoconferencing system for streaming a video conference.

FIG. 4 schematically illustrates a multi-point videoconferencing system 400 comprising a plurality of videoconferencing terminals 401, 402 in communication with a multipoint conferencing node (MCN) 403. In the multi-point videoconferencing system 400 media passes through the MCN 403. Input audio and video captured at the videoconferencing terminals 401, 402 are transmitted to the MCN 403, mixed with the audio and video from the other videoconferencing terminals 401, 402, and the mixed audio and video is transmitted back to the videoconferencing terminals 401, 402. The multi-point videoconferencing system 400 further comprises a streaming server 404 in communication with the MCN 403. The plurality of videoconferencing terminals 401, 402 and the streaming server 404 are all connected to the MCN 403 using standard video conferencing protocols such as SIP, H.323 or WebRTC, and transmits the audio and video using the Real-time Transport Protocol (RTP). The MCN 403 mixes the audio and video from the plurality of videoconference terminals 401, 402 into a source media stream 405 comprising mixed audio and video received from the plurality videoconference terminals 401, 402. The MCN 403 transcodes the source media stream 405 into at least one of a plurality of resolutions, e.g. 1080p, 720p, 560p and/or 360p and transmits the source media stream 405 in the at least one of the plurality of resolutions to the streaming server 404 using Real-time Transport Protocol (RTP). A plurality of media stream viewers 406, 407, 408 is in communication with the streaming server 404. The streaming server 404 negotiates unidirectional capabilities with each of the plurality of media stream viewers 406, 407, 408 using WebRTC. The streaming server 404 performs repacketization of the source media stream 405 into separate media streams 409, 410, 411 to each of the plurality of media stream viewers 406, 407, 408, according to their respective negotiated unidirectional capabilities. The streaming server 404 transmits the separate media streams 409, 410, 411 to the respective plurality of media stream viewers 406, 407, 408 using RTP. The streaming server 404 may also perform encryption for each of the separate media streams 409, 410, 411.

The WebRTC connection between a media stream viewer 406, 407, 408 and the streaming server 404 may be initiated by following a link, e.g. a HTPP-link, to a WebRTC server, as will be described in further detail below. Each of the media stream viewers 406, 407, 408 may request to receive a media stream 409, 410, 411, respectively, in one of a plurality of resolutions from the streaming server 404. If the source media stream 405 received from the MCN 403 comprises the requested one of a plurality of resolutions, the streaming server 404 will transmit a media stream 409, 410, 411 in the requested on of a plurality of resolutions to the media stream viewer 406, 407, 408. If upon receiving the request from one of the plurality of the plurality of the media stream viewers 406, 407, 408, the streaming server 404 determines that the source media stream 405 received from the MCN 403 does not comprise the requested one of the plurality of resolutions, then the streaming server 404 sends a request to the MCN 403 to transcode and transmit the requested one of the plurality of resolutions. Once received by the streaming server 404, the streaming server 404 will transmit the media stream 409, 410, 411 in the requested one of a plurality of resolutions to the media stream viewer 406, 407, 408. Upon determining with the MCN 403 that one of the plurality of resolutions is no longer requested by the streaming server 404, that is no longer requested by any of the plurality of media stream viewers 406, 407, 408, then the MCN 403 will stop transcoding and transmitting the one of the plurality of resolutions, i.e. the no longer requested one of the plurality of resolutions. In FIG. 4, each of the media stream viewers 406, 407, 408 receives the media streams 409, 410, 411 in different resolutions. The first media stream 409 transmitted to the first media stream viewer 406 is in resolution 560p, the second media stream 410 transmitted to the second media stream viewer 407 is in resolution 720p, and the third media stream 411 transmitted to the third media stream viewer 408 is in 1080p.

As explained in detail above, in the multi-point videoconferencing system 400, the MCN 403 is responsible for creating composed video streams and transcoding them to requested bitrates and resolutions, and the streaming server 404 is responsible for forwarding requested streams from the MCN 403 to the plurality of media stream viewers performing repacketization and/or encryption for each of the plurality of media stream viewers. E.g. if ten media stream viewers request a 1080p stream, the MCN creates such stream once, while the streaming server 404 creates ten copies, one for each the ten media stream viewers. For prior art HTTP streaming, the streaming web server 102 is pre-configured to transcode the source stream into a set of standard resolutions and bitrates. For example, the HTTP streaming web server 102 may be configured with 1080p, 720 pm 560p and 360p. Even if none of the clients 106, 107 receive the 560p and 360p resolutions, the HTTP streaming web server 102 will spend CPU resources on transcoding. Under similar circumstances, as illustrated in FIG. 4, the streaming server 404 will not request 360p resolution from the MCN 403 thus saving CPU and bandwidth resources.

FIG. 5 schematically illustrates an WebRTC session between the second media stream viewer 407 and the streaming server 404. The second media stream viewer 407 initiates a WebRTC connection by following a link to a WebRTC server 501, the link including the address of the streaming server 404. The second media stream viewer 407 then sends a first Session Description 502 to the WebRTC server 501. The first Session description 502 is a specification of the capabilities of the second media stream viewer 407, e.g. supported audio and video codecs, codec extensions etc. The WebRTC server 501 initiates a WebRTC connection to the streaming server 404 and sends the first Session Description 502 to the streaming server 404. Similarly, the streaming server 404 sends a second Session Description 503 to the second media viewer 407 via the WebRTC server 501. The second Session Description 503 is a specification of the capabilities of the streaming server 404, e.g. supported audio and video codecs, codec extensions etc. Once the first and second Session Descriptions 502, 503 have been exchanged, the second media stream viewer 407 and the streaming server 404 know what codecs that can be used to make communication between the second media stream viewer 407 and the streaming server 404 possible, as well as how to establish direct connection between them. In this case, the second media stream viewer 407 and the streaming server 404 will negotiate unidirectional capabilities, such that the second media stream viewer 407 only will receive media streams, and the streaming server 404 will only transmit media streams. Then the streaming server 404 will start sending a media stream 504 comprising audio and video to the second media stream viewer 407 using RTP. As for the first media file 104a, the media stream 504 comprises a plurality of video frames, I-frames 505 and P-frames 506.

When audio and video are delivered using RTP protocol as opposed to segment files for the HTTP streaming server 102 a significant reduction in latency is achieved. In contrast to downloading segment files, when delivering video using RTP protocol the second video stream viewer 407 is able to decode and display each video frame 505, 506 as fast it is possible to receive and decode the video frame 505, 506. In this case, the playback latency consists of two components, network latency and frame decoding time. The network latency is the time it takes to receive all the bytes of the video frame 505, 506 at the second video stream viewer 407. The frame decoding time, e.g. decoder performance, varies depending on processing capabilities of the decoder and on the resolution of the media stream 504. However, the frame decoding time is in practice negligible, thus the playback latency is mainly due to the network latency and may be as low as 20 ms. This in contrast to the prior art HTPP streaming latency of several seconds.

If network conditions are good, it is only required to send an I-frame 505 once at the beginning of the RTP communication. However, if the video decoder at some point after receiving the first I-frame 505 is unable to decode the media stream 504, the video decoder may send a message requesting a new I-frame as a new starting point. This may be caused by missing P-frames due to packet loss. The situation may also occur of the video decoder does not receive the first I-frame 505. I-frames are thus created when needed. In the following a message requesting a new I-frame is for simplicity referred to as a Picture Loss Indication (PLI). However, the term PLI is intended to also encompass any other RTCP message with a similar purpose to PLI, such as Full Intra Request (FIR).

FIG. 6 schematically illustrates a situation where the second video stream viewer 407 request to receive the second media stream 410 in one of the plurality of resolutions, e.g. 1080p, from the streaming server 404. Assuming the source media stream 405 received from the MCN 403 comprises the requested one of a plurality of resolutions, the streaming server 404 will transmit the second media stream 410 in the requested one of a plurality of resolutions to the second media stream viewer 407. The second media stream 410 comprises a plurality of video frames 601, 602, 603. The I-frame 601 is the first video frame sent in the second media stream 410 and is used as a reference for the next P frames 602, 603. Here, the first video stream viewer 406 joins the conference late and requests to receive the first media stream 409 in the same one of the plurality of resolutions from the streaming server 404. Since the streaming server 404 already receives the one of the plurality of resolutions, the streaming server 404 will not request the MCN 403 to transcode and transmit a new resolution in the source media stream 405. The first video frame sent in the first media stream 409 is then a P-frame 603. The first video stream viewer 406 will not be able to decode the first media stream 409 as it did not receive the I-frame 601. The first video stream viewer 406 may then send a PLI message to the streaming server 404 to receive a new I-frame, however, as will be discussed later, when many participating video stream viewers may join late this process may be problematic for a streaming video conference.

Figure 7:
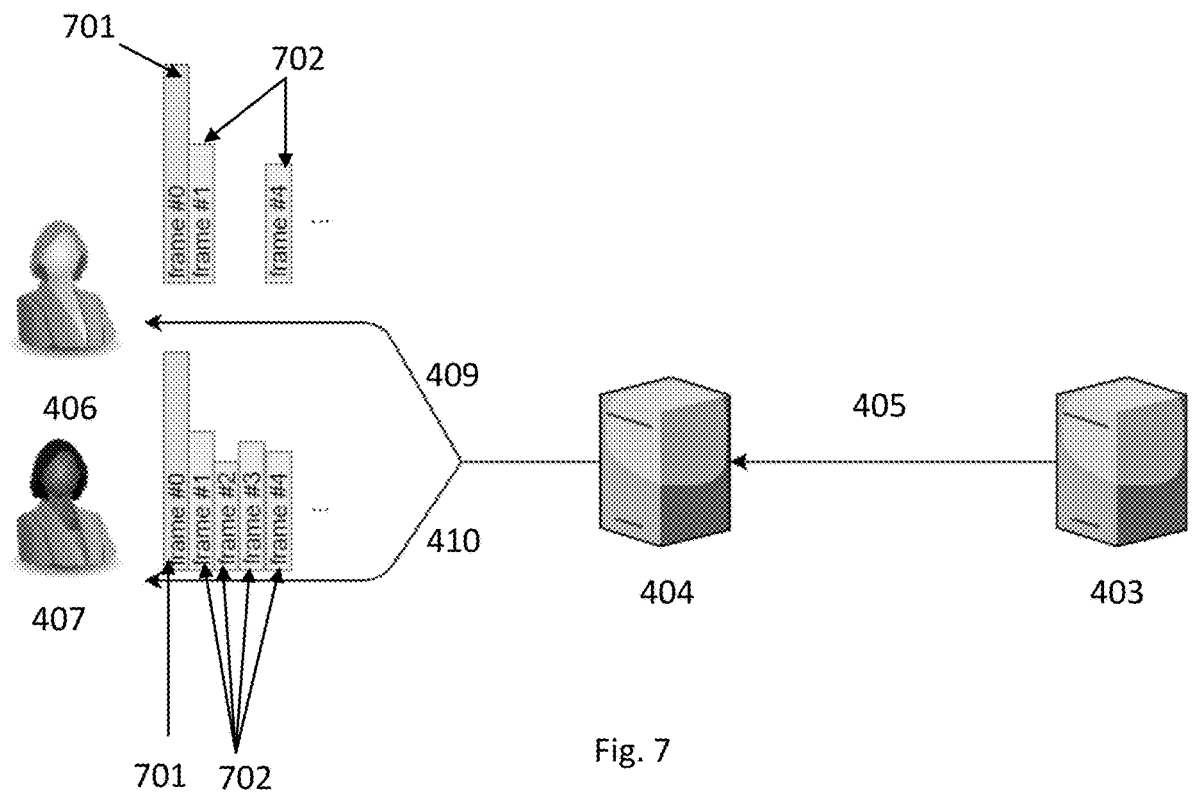
FIG. 7 is a schematic illustration an exemplary multi-point videoconferencing system for streaming a video conference.

FIG. 7 schematically illustrates a situation where the first video stream viewer 406 receives the first media stream 409 and the second video stream viewer 407 receives the second media stream 410. The first media stream 409 and the second media stream 410 both comprises a plurality of video frames 701, 702. The I-frame 701 is the first video frame sent in the both the first and second media streams 409, 410 and is used as a reference for the next P frames 702. Two of the P-frames 702 are missing in the first media stream 409, thus the first video stream viewer 406 will not be able to continue decoding the first media stream 409. The first video stream viewer 406 may then send a PLI message to the streaming server 404 to receive a new I-frame, however, as will be discussed later, this process may be problematic for a streaming video conference with many participating video stream viewers, where some participants may suffer massive packet loss in their media streams, whereas other participants do not experience packet loss at all.

Now with reference to FIG. 6 and FIG. 7, the streaming server 404 may forward the PLI's to the MCN 403 immediately after receiving the PLI's from the plurality of plurality of media stream viewers 406, 407. The MCN 403 would then receive the PLIs and produce a source media stream 405 where for each PLI an I-frame is introduced in the source media stream 405. For a large streaming video conference the MCN 403 may receive an excessive amount of PLI's, resulting in an excessive amount of I-frames in both the source media stream 405 and in the plurality of media streams 409, 410 to each of the plurality of media stream viewers 406, 407. As I-frames are large in size, the excessive amount of I-frames lead to increased bandwidth usage. The increased bandwidth usage may provoke packet loss for participants previously not experiencing packet loss, leading to even more PLI's and so on.

In one embodiment of the present invention, the step of transcoding the source media stream 405 into at least one of a plurality of resolutions further comprising generating video streams with I-frames at a predetermined fixed rate, i.e. with periodic I-frames. In the cases when packet loss occurs or a new participant joins in the middle of the stream, the I-frames are inserted at a fixed rate sufficient to provide a decodable stream for all participants. The fixed rate of I-frames is furthermore sufficiently low to prevent excessive bandwidth usage. When the MCN 403 generates video streams with periodic I-frames the streaming server 404 is adapted to ignore any PLI's from the plurality of media stream viewers 406, 407. To further avoid unnecessary PLI communication between the plurality of media stream viewers 406, 407 and the streaming server 404, the Session Description 503 of the streaming server 404 may indicate that it does not support PLI.

In another embodiment of the present invention, the streaming server 404 performs rate limiting of Picture Loss Indication (PLI) messages received from plurality of media stream viewers 406, 407 on the streaming server 404, and is transmitting a rate limited number of the PLI messages to the MCN 403. One exemplary rate limited number of PLI messages is maximum 2 PLI messages per second. Then the maximum I-frame period would be 2 seconds, and in good network conditions no unnecessary I-frames would be generated.

Figure 8:
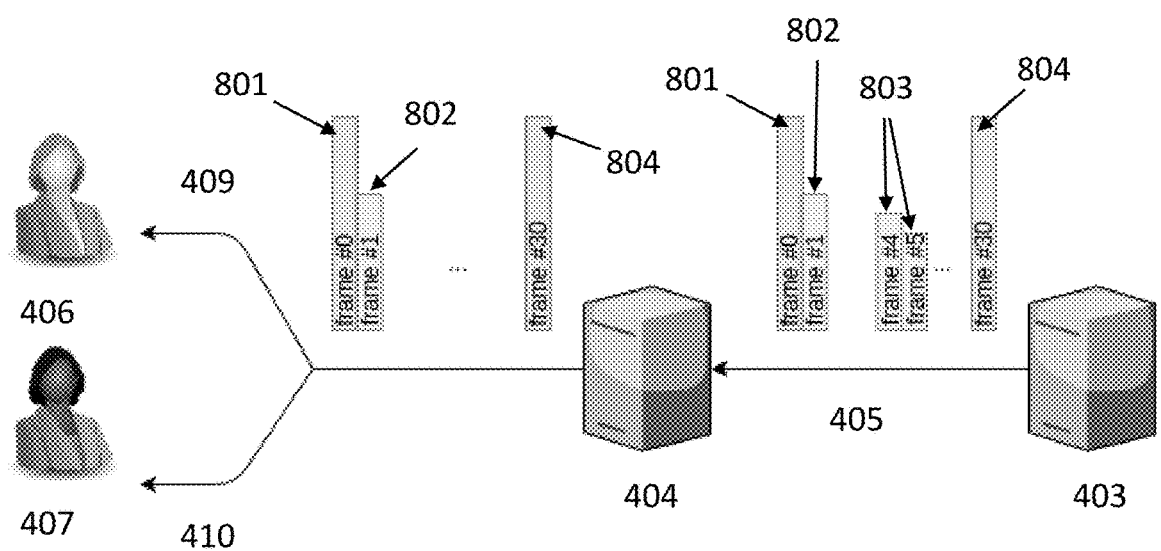
FIG. 8 is a schematic illustration an exemplary multi-point videoconferencing system for streaming a video conference.

FIG. 8 schematically illustrates a situation where there is packet loss in the source media stream 405 between the MCN 403 and the streaming server 404. The first video stream viewer 406 receives the first media stream 409 and the second video stream viewer 407 receives the second media stream 410. The first media stream 409 and the second media stream 410 both comprises a plurality of video frames 801, 802, 803. The I-frame 801 is the first video frame sent in the both the first and second media streams 409, 410 and is used as a reference for the next P frames 802, 803. Two of the P-frames are missing in the source media stream 405, e.g. due to packet loss. Thus, none of the video stream viewers 406, 407 would be able to decode anything past the first P-frame 802. In the best case, the video stream viewers 406, 407 may ignore all packets past the first P-frame 802 and show a frozen video frame until the next I-frame 804 arrives. However, it is likely that the video stream viewers 406, 407 would show video artifacts as a result of decoding a corrupted media stream. Furthermore, bandwidth is wasted for transmitting P-frames 803 that cannot be used to decode a valid video stream due to the missing P-frames.

The streaming server 404 is configured to detect packet loss in the source media stream 405, then stopping transmission of the P-frames 803 to the plurality of video stream viewers 406, 407 until a new I-frame 804 is received by the streaming server 404. The media streams 409, 410 thus only comprises the first I-frame 801, the first P-frame 802, and the next I-frame 804. This guarantees that the video stream viewers 406, 407 will show a frozen video frame instead of video artifacts.

Figure 9:
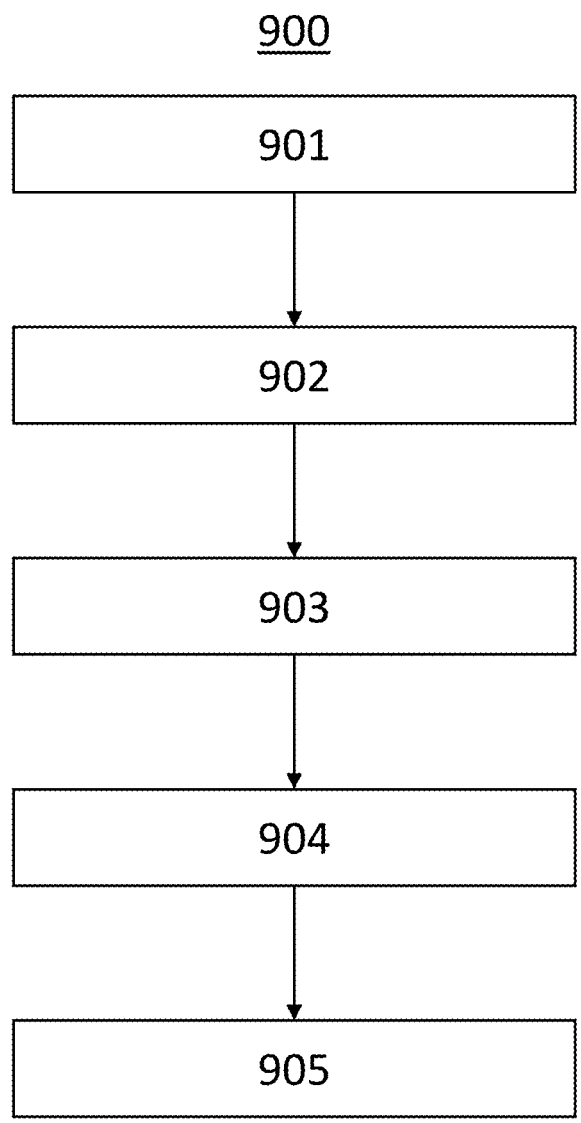
FIG. 9 is an exemplary flowchart of a method of streaming a video conference.

FIG. 9 is an exemplary flowchart of a method 900 of streaming a video conference in the multi-point videoconferencing system comprising the plurality of video conferencing terminals 401, 402 in communication with the multipoint conferencing node (MCN) 403, the streaming server 404 in communication with the MCN and the plurality of media stream viewers 406, 407, 408 in communication with the streaming server 404. The method 900 comprises the steps:

transcoding 901, using the MCN 403, the source media stream 405 into at least one of a plurality of resolutions, the source media stream comprising mixed audio and video received from the plurality videoconference terminals 401, 402;

transmitting 902 the source media stream 405 in the at least one of the plurality of resolutions to the streaming server 404 using Real-time Transport Protocol (RTP);

negotiating 903, using the streaming server 404, unidirectional capabilities with each of the plurality of media stream viewers 406, 407, 408 using WebRTC;

repacketization 904, using the streaming server 404, of the source media stream 405 into separate media streams 409, 410, 411 to each of the plurality of media stream viewers 406, 407, 408 according to their respective negotiated unidirectional capabilities, and transmitting 905, the separate media streams 409, 410, 411 from the streaming server (404) to the respective plurality of media stream viewer 406, 407, 408 using RTP.

Figure 10:
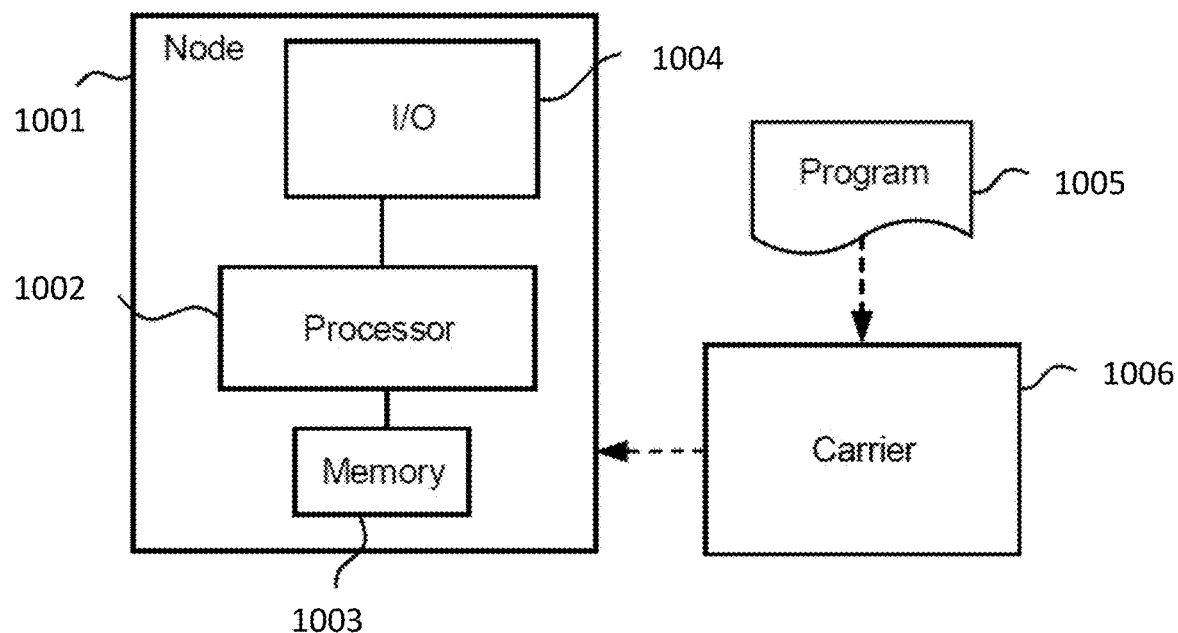
FIG. 10 is a schematic illustration of a Multipoint Conferencing Node.

Turning now to FIG. 10, a schematically illustrated multipoint conferencing node (MCN) 1001. The MCN 1001 comprises an input/output circuitry 1004, at least one processor 1002 and a memory 1003. The memory 1003 contains instructions executable by the processor 1002, cause the multipoint conferencing node 1001 to:

perform transcoding of a source media stream 405 into at least one of a plurality of resolutions, the source media stream comprising mixed audio and video received from the plurality videoconference terminals 401, 402; and transmitting the source media stream 405 in the at least one of the plurality of resolutions to the streaming server 404 using Real-time Transport Protocol (RTP).

The instructions that are executable by the processor 1002 may be software in the form of a computer program 1005. The computer program 1005 may be contained in or by a carrier 1006, which may provide the computer program 1005 to the memory 1003 and processor 1002. The carrier 1006 may be in any suitable form including an electronic signal, an optical signal, a radio signal or a computer readable storage medium.

Figure 11:
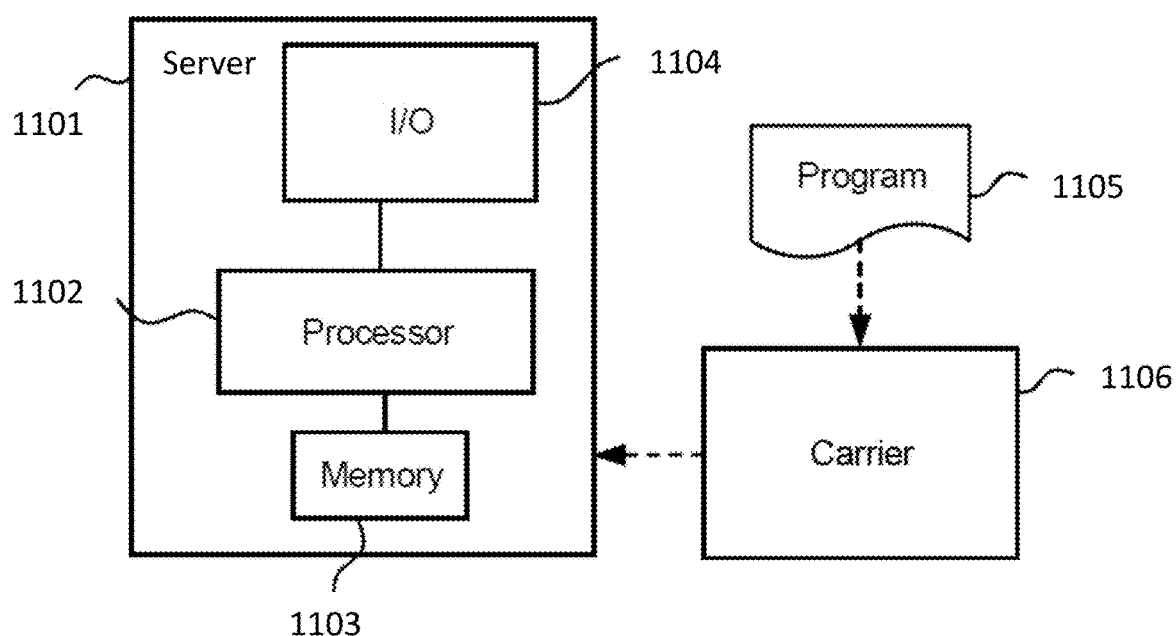
FIG. 11 is a schematic illustration of a streaming server.

Turning now to FIG. 11, a schematically illustrated streaming server 1101. The streaming server 1101 comprises an input/output circuitry 1104, at least one processor 1402 and a memory 1103. The memory 1103 contains instructions executable by the processor 1102, cause the streaming server 1101 to:

negotiating unidirectional capabilities with each of the plurality of media stream viewers 406, 407, 408 using WebRTC;

performing repacketization, using the streaming server 404, of the source media stream 405 into separate media streams 409, 410, 411 to each of the plurality of media stream viewers 406, 407, 408 according to their respective negotiated unidirectional capabilities; and transmitting the separate media streams 409, 410, 411 from the streaming server 404 to the respective plurality of media stream viewer 406, 407, 408 using RTP.

The instructions that are executable by the processor 1102 may be software in the form of a computer program 1105. The computer program 11005 may be contained in or by a carrier 1106, which may provide the computer program 1106 to the memory 1103 and processor 1102. The carrier 1106 may be in any suitable form including an electronic signal, an optical signal, a radio signal or a computer readable storage medium.

As used herein, the term "computer readable medium" may be a universal serial bus (USB) memory, a digital versatile disc (DVD), a Blu-ray disc, a software module that is received as a stream of data, a Flash memory, a hard drive, a memory card, such as a MemoryStick, a multimedia card (MMC), secure digital (SD) card, etc. One or more of the aforementioned examples of computer readable medium may be provided as one or more computer program products.

In the preceding description, various aspects of the method and imaging processing device according to the invention have been described with reference to the illustrative embodiment. For purposes of explanation, specific numbers, systems and configurations were set forth in order to provide a thorough understanding of the system and its workings. However, this description is not intended to be construed in a limiting sense. Various modifications and variations of the illustrative embodiment, as well as other embodiments of the method and image processing device, which are apparent to persons skilled in the art to which the disclosed subject matter pertains, are deemed to lie within the scope of the present claims.

What is claimed is:

1. A method of streaming a video conference in a multipoint videoconferencing system comprising a plurality of video conferencing terminals in communication with a multipoint conferencing node (MCN), a streaming server in communication with the MCN and a plurality of media stream viewers in communication with the streaming server, wherein the method comprising:

transcoding, using the MCN, a source media stream into at least one of a plurality of resolutions, the source media stream comprising mixed audio and video received from the plurality videoconference terminals, transmitting the source media stream in the at least one of the plurality of resolutions to the streaming server using Real-time Transport Protocol (RTP);

negotiating, using the streaming server, unidirectional capabilities with each of the plurality of media stream viewers using WebRTC;

repacketization, using the streaming server, of the source media stream into separate media streams to each of the plurality of media stream viewers according to their respective negotiated unidirectional capabilities; and transmitting the separate media streams from the streaming server to the respective plurality of media stream viewer using RTP.

2. The method of claim 1, further comprising the steps of:

receiving a request on the streaming server from one of the plurality of the media stream viewer to receive the separate media stream in one of the plurality of resolutions; and sending a request to the MCN from the streaming server to transcode and transmit the requested one of the plurality of resolutions if determining with the streaming server that the source media stream received from the MCN does not comprise the requested one of the plurality of resolutions.

3. The method of claim 1, further comprising the step of upon determining with the MCN that one of the plurality of resolutions is not requested by the streaming server stop transcoding and transmitting the one of the plurality of resolutions.

4. The method of claim 1, wherein the step of transcoding the source media stream into at least one of a plurality of resolutions further comprising generating video streams with I-frames at a predetermined fixed rate.

5. The method of claim 1, further comprising the step of performing rate limiting of Picture Loss Indication (PLI) messages received from plurality of media stream viewers on the streaming server, and transmitting a rate limited number of the PLI messages to the MCN.

6. The method of claim 5, wherein the rate limited number is maximum 2 PLI messages per second.

7. The method of claim 1, wherein method further comprising the steps of upon detecting with the streaming server packet loss in the source media stream, then stopping transmission of P-frames to the plurality of video stream viewers until a new I-frame is received by the streaming server.

8. A multi-point videoconferencing system for streaming of a video conference, the system comprising a plurality of video conferencing terminals in communication with a multipoint conferencing node (MCN), a streaming server in communication with the MCN and a plurality of media stream viewers in communication with the streaming server, wherein:

the MCN is adapted to:
perform transcoding of a source media stream into at least one of a plurality of resolutions, the source media stream comprising mixed audio and video received from the plurality videoconference terminals;
transmitting the source media stream in the at least one of the plurality of resolutions to the streaming server using Real-time Transport Protocol (RTP);

the streaming server is adapted to:
negotiating unidirectional capabilities with each of the plurality of media stream viewers using WebRTC;
performing repacketization, using the streaming server, of the source media stream into separate media streams to each of the plurality of media stream viewers according to their respective negotiated unidirectional capabilities; and
transmitting the separate media streams from the streaming server to the respective plurality of media stream viewer using RTP.

9. The system of claim 8, wherein the streaming server is further adapted to receiving a request from one of the plurality of the media stream viewer to receive the separate media stream in one of the plurality of resolutions; and
sending a request to the MCN to transcode and transmit the requested one of the plurality of resolutions if determining with the streaming server that the source media stream received from the MCN does not comprise the requested one of the plurality of resolutions.

10. The system of claim 8, wherein the MCN is further adapted to upon determining that one of the plurality of resolutions is not requested by the streaming server stop transcoding and transmitting the one of the plurality of resolutions.

11. The system of claim 8, wherein MCN is further adapted to generating video streams with I-frames at a predetermined fixed rate when transcoding the source media stream into at least one of a plurality of resolutions.

12. The system of claim 8, wherein the streaming server is further adapted to performing rate limiting of Picture Loss Indication (PLI) messages received from plurality of media stream viewers, and transmitting a rate limited number of the PLI messages to the MCN.

13. The system of claim 12, wherein the rate limited number is maximum 2 PLI messages per second.

14. The system of claim 8, wherein the streaming server is further adapted to upon detecting packet loss in the source media stream, then stopping transmission of P-frames to the plurality of video stream viewers until a new I-frame is received by the streaming server.

* * * * *